United States Patent [19]
Chester et al.

[11] 4,452,958
[45] Jun. 5, 1984

[54] OLEFIN POLYMERIZATION WITH CATALYSTS DERIVED FROM CHROMIUM EXCHANGED ZEOLITES

[75] Inventors: Arthur W. Chester, Cherry Hill; Murray: James G., East Brunswick, both of N.J.; Albert B. Schwartz, Philadelphia, Pa.

[73] Assignee: Mobil Oil Corporation, New York, N.Y.

[21] Appl. No.: 497,319

[22] Filed: May 23, 1983

Related U.S. Application Data

[63] Continuation-in-part of Ser. No. 336,105, Dec. 30, 1981, abandoned.

[51] Int. Cl.$^3$ .............................................. C08F 4/22
[52] U.S. Cl. .................................... 526/130; 526/123
[58] Field of Search .................. 526/106, 123, 130

[56] References Cited

U.S. PATENT DOCUMENTS

| Re. 29,948 | 3/1979 | Dwyer et al. | 208/110 |
| 2,950,952 | 8/1960 | Breck et al. | 423/329 |
| 3,012,853 | 12/1961 | Milton | 423/329 |
| 3,702,886 | 11/1972 | Argauer et al. | 423/328 |
| 3,709,853 | 1/1973 | Karapinka | 260/88.2 D |
| 3,709,979 | 1/1973 | Chu | 423/328 |
| 3,832,449 | 8/1974 | Rosinski et al. | 423/111 |
| 4,016,245 | 4/1977 | Plank et al. | 423/328 |
| 4,046,859 | 9/1977 | Plank et al. | 423/328 |
| 4,076,842 | 2/1978 | Plank et al. | 423/328 |
| 4,086,186 | 4/1978 | Rubin et al. | 252/430 |
| 4,116,813 | 9/1978 | Rubin et al. | 200/46 |
| 4,302,566 | 11/1981 | Karol et al. | 526/125 |
| 4,375,573 | 3/1983 | Young et al. | 585/467 |

Primary Examiner—Paul R. Michl
Attorney, Agent, or Firm—A. J. McKillop; M. G. Gilman; Edward F. Kenehan, Jr.

[57] ABSTRACT

There is provided the polymerization of 1-olefins such as ethylene with zeolite supported, chromium catalyst compositions. Chromium ions are ion exchanged with zeolites to produce such catalysts.

13 Claims, No Drawings

OLEFIN POLYMERIZATION WITH CATALYSTS DERIVED FROM CHROMIUM EXCHANGED ZEOLITES

CROSS REFERENCE TO RELATED APPLICATION

This applicatiion is a continuation-in-part application of copending U.S. application Ser. No. 336,105, filed Dec. 30, 1981 now abandoned.

BACKGROUND

The present invention relates to olefin polymerization with catalysts derived from chromium exchanged zeolites.

The supports commonly used for transition metal ethylene polymerization catalysts of the Phillips type have generally been high surface area amorphous silicas or silica-aluminas. These have been impregnated with chromium salts, calcined, and reduced to produce the low valency transition metal stabilized by reaction with the silica hydroxyls required for an active polymerization catalyst.

SUMMARY

The present invention provides a process for polymerizing 1-olefins by contacting one or more 1-olefin monomers with a catalytically effective amount of such a catalyst composition comprising the ion exchange product of chromium with a particular type of crystalline aluminosilicate compound. The zeolite material employed has a Constraint Index of at least about 1. The polymerization takes place under temperature and pressure conditions which are suitable for promoting a polymerization reaction.

DETAILED DESCRIPTION

As noted, catalyst compositions employed for olefin polymerization in accordance with the present invention comprise the ion exchange product of chromium with a crystalline aluminosilicate zeolite.

An important characteristic of the crystal structure of this particular class of zeolites is that it provides a selective constrained access to and egress from the intracrystalline free space. One particular class of zeolites which are useful in accordance with the present invention has a constraint index within the approximate range of about 1 to 12 and a silica to alumina ratio of at least about 12. This class of zeolites has an effective pore size intermediate between the small pore Linde A and the large pore Linde X, i.e. the pore windows of the structure are of about a size such as would be provided by 10-membered rings of silicon atoms interconnected by oxygen atoms. It is to be understood, of course, that these rings are those formed by the regular disposition of the tetrahedra making up the anionic framework of the crystalline zeolite, the oxygen atoms themselves being bonded to the silicon (or aluminum, etc.) atoms at the centers of the tetrahedra.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other form within the channels. Although zeolites with a silica to alumina mole ratio of at least 12 are useful, it is preferred in some instances to use zeolites having substantially higher silica/alumina ratios, e.g. 1600 and above. In addition, zeolites as otherwise characterized herein but which are substantially free of aluminum, that is zeolites having silica to alumina mole ratios of up to infinity, are found to be useful and even preferable in some instances. Such "high silica" or "highly siliceous" zeolites are intended to be included within this description. Also to be included within this definition are substantially pure silica analogs of the useful zeolites described herein, that is to say those zeolites having no measurable amount of aluminum (silica to alumina mole ratio of infinity) but which otherwise embody the characteristics disclosed.

Members of this first particular class of zeolites, after activation, acquire an intracrystalline sorption capacity for normal hexane which is greater than that for water, i.e. they exhibit "hydrophobic" properties. This hydrophobic character can be used to advantage in some applications.

Zeolites of the first particular class useful herein have an effective pore size such as to freely sorb normal hexane. In addition, their structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger crosssection than normal hexane is excluded and the zeolite is not of the first particular class described herein. Windows of 10-membered rings are preferred, although in some instances excessive puckering of the rings or pore blockage may render these zeolites ineffective to freely sorb normal hexane.

Although 12-membered rings in theory would not offer sufficient constraint to produce constrained access, it is noted that the puckered 12-ring structure of TMA offretite does show some constrained access. Other 12-ring structures may exist which may be operative for other reasons and, therefore, it is not the present intention to entirely judge the usefulness of a particular zeolite solely from theoretical structure considerations.

Rather than attempt to judge from crystal structure whether or not a zeolite possesses the constrained access to molecules of larger cross-section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. for at least 15 minutes. The zeolite is then flushed with helium and the temperature is adjusted between 290° C. and 510° C. to give an overall conversion of between 10 percent and 60 percent. The mixture of hydrocarbons is passed at 1 liquid hourly space velocity (i.e., 1 volume of liquid hydrocarbon per volume of zeolite per hour) over the zeolite with a helium dilution to give a helium to (total) hydrocarbon mole ratio of 4:1. After 20 minutes on stream, a sample of the effluent is taken and analyzed, most conveniently by gas chromatography, to determine the fracction remaining unchanged for each of the two hydrocarbons.

While the above experimental procedure will enable one to achieve the desired overall conversion of 10 to 60 percent for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. and a liquid hourly space velocity of less than one, such as 0.1 or less, can be employed in order to achieve a minimum total conversion of about 10 percent.

The "Constraint Index" is calculated as follows:

$$\text{Constraint Index} = \frac{\log_{10}(\text{fraction of hexane remaining})}{\log_{10}(\text{fraction of 3-methylpentane remaining})}$$

The Constraint Index approximates the ratio of the cracking rate constants for the two hydrocarbons. Constraint Index (CI) values for some typical materials are:

|  | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| ZSM-48 | 3.4 |
| TMA Offretite | 3.7 |
| Clinoptilolite | 3.4 |
| Beta | 1.5 |
| H—Zeolon (mordenite) | 0.4 |
| REY | 0.4 |
| Amorphous Silica-Alumina | 0.6 |
| Erionite | 38 |

The above-described Constraint Index is an important definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the Constraint Index. Therefore, it will be appreciated that it may be possible to so select test conditions as to establish more than one value in the range of 1 to 12 for the Constraint Index of a particular zeolite. Such a zeolite exhibits the constrained access as herein defined and is to be regarded as having a Constrained Index in the range of 1 to 12. Also contemplated herein as having a Constraint Index in the range of 1 to 12 and therefore within the scope of the first particular defined class of highly siliceous zeolites are those zeolites which, when tested under two or more sets of conditions within the above-specified ranges of temperature and conversion, produce a value of the Constraint Index slightly less than 1, e.g. 0.9, or somewhat greater than 12, e.g. 14 or 15, with at least one other value within the range of 1 to 12. Thus, it should be understood that the Constraint Index value as used herein is an inclusive rather than a exclusive value. That is, a crystalline zeolite when identified by any combination of conditions within the testing definition set forth herein as having a Constraint Index in the range of 1 to 12 is intended to be included in the instant first particular zeolite class definition whether or not the same identical zeolite, when tested under other of the defined conditions, may give a Constraint Index value outside of the range of 1 to 12.

The first particular class of zeolites defined herein is exemplified by ZSM-5, ZSM-11, ZSM-12, ZSM-23, ZSM-35, ZSM-38, ZSM-48 and other similar materials.

ZSM-5 is described in greater detail in U.S. Pat. No. 3,702,886 and U.S. Pat. No. Re. 29,948. The entire descriptions contained within those patents, particularly the X-ray diffraction pattern of therein disclosed ZSM-5, are incorporated herein by reference.

ZSM-11 is described in U.S. Pat. No. 3,709,979. That description, and in particular the X-ray diffraction pattern of said ZSM-11, is incorporated herein by reference.

ZSM-12 is described in U.S. Pat. No. 3,832,449. That description, and in particular the X-ray diffraction pattern disclosed therein, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,375,573 and published European patent application No. 80 300463. The description of that zeolite, and particularly the specified X-ray diffraction pattern thereof, is incorporated herein by reference.

A second particular class of zeolites which are useful in accordance with the present invention has at least some crystalline aluminosilicate zeolite material characterized by a crystalline structure having pore windows formed by 8-membered rings of oxygen atoms, e.g., offretite, erionite, chabazite, Zeolite T, Zeolite W and ZSM-34. Such zeolites have a crystal structure that provides constrained access to, and egress from, the intracrystalline free space by virtue of having a pore dimension which is usually greater than about 3.6×3.7 Angstroms. Such zeolites also generally have a Constraint Index substantially greater than 12. Zeolitic material of this type has pore windows of about the size such as would be provided by 8-membered rings of oxygen atoms. It is to be understood that these rings are those formed by the regular disposition of the tetrahedra making up the anionic framework of the crystalline aluminiosilicate zeolite, the oxygen atoms themselves being bonded to silicon (or aluminum) atoms at the centers of the tetrahedra.

It should also be understood that the zeolites according to this second particular class of zeolites include zeolite types which may contain some crystalline zeolitic material having pore windows of a size formed by oxygen atom rings containing more than 8 members. For example, a number of natural and synthetic zeolites are known to comprise intergrowths of more than one type of crystalline material. Thus, a given zeolite may contain some crystalline material which has pore windows formed by 8-membered rings of oxygen atoms and some material having pore windows formed by 10 or 12 membered rings. The zeolites employed as representative of the second particular class of zeolites in the process of the instant invention are those which have at least a portion of their total crystalline zeolitic material composed of zeolite material having pore windows formed by 8-membered rings of oxygen atoms.

Zeolites which comprise at least some of the 8-membered ring crystalline zeolite material include those of the erionite-offretite family such as synthetic and natural erionite, synthetic and natural offretite, Zeolite T, Zeolite W, natural and synthetic chabazite and ZSM-34. Chabazite, erionite and offretite are all more particularly described in Meier and Olson, *Atlas of Zeolite Structure Types*, published in 1978 by the International Zeolite Association and the references cited therein. Zeolite T is described in U.S. Pat. No. 2,950,952 and Zeolite W is described in U.S. Pat. No. 3,012,853. All of these publications and patents are incorporated herein by reference.

A particularly preferred zeolite material for use in the catalyst compositions of the present invention is ZSM-34. ZSM-34 and its synthesis are more fully described in Rubin et al; U.S. Pat. No. 4,116,813, issued Sept. 26, 1978 and its parent U.S. Pat. No. 4,086,186, issued Apr. 25, 1978. These patents are also incorporated herein by reference.

ZSM-34 is a unique crystalline aluminosilicate zeolite, belonging to the erionite-offretite family, having the composition, as synthesized, and after drying of:

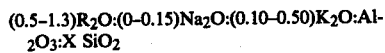

$(0.5-1.3)R_2O:(0-0.15)Na_2O:(0.10-0.50)K_2O:Al_2O_3:X\ SiO_2$ where R is the organic nitrogen-containing cation derived from choline $[(CH_3)_3NCH_2CH_2OH]$ and X is 8 to 50, preferably 8 to 30 and still more preferably 8 to 20. This zeolite, unlike other members of the erionite-offretite family, appears to have a tabular morphology and the capability, after calcination at 1000° F. for at least a period of time to remove the organic cation, of sorbing at least 9.5 weight percent of n-hexane, at ambient temperature and a n-hexene pressure of 20 mm. which is higher than that for any other known offretite or erionite. ZSM-34 is characterized by the X-ray powder diffraction pattern as set forth in the aforementioned U.S. Pat. No. 4,116,813 and U.S. Pat. No. 4,086,186.

In all of the foregoing zeolites, the original cations can be subsequently replaced, at least in part, by calcination and/or ion exchange with another cation. Thus, the original cations can be exchanged into a hydrogen or hydrogen ion precursor form or a form in which the original cations have been replaced by a metal of, for example, Groups II through VIII of the Periodic Table. Thus, it is contemplated to exchange the original cations with ammonium ions or with hydronium ions. Catalytically active forms of these zeolites would include, in particular, hydrogen, rare earth metals, calcium, nickel, palladium and other metals of Groups II and VIII of the Periodic Chart. It is generally the hydrogen form of such zeolites which can be ion exchanged with transition metals to form the polymerization catalysts of the present invention.

It is to be understood that by incorporating by reference the foregoing patents to describe examples of specific members of the specified zeolite classes with greater particularity, it is intended that identification of the therein disclosed crystalline zeolites be resolved on the basis of their respective X-ray diffraction patterns.

As discussed above, the present invention contemplates utilization of such catalysts wherein the mole ratio of silica to alumina is essentially unbounded. The incorporation of the identified patents should therefore not be construed as limiting the disclosed crystalline zeolites to those having the specific silica-alumina mole ratios discussed therein, it now being known that such zeolites may be substantially aluminum-free and yet, having the same crystal structure as the disclosed materials, may be useful or even preferred in some applications. It is the crystal structure, as identified by the X-ray diffraction "fingerprint", which establishes the identity of the specific crystalline zeolite material.

The specific zeolites described, when prepared in the presence of organic cations, are substantially catalytically inactive, possibly because the intra-crystalline free space is occupied by organic cations from the forming solution. They may be activated by heating in an inert atmosphere at 540° C. for one hour, for example, followed by base exchange with ammonium salts followed by calcination at 540° C. in air. The presence of organic cations in the forming solution may not be absolutely essential to the formation of this type zeolite; however, the presence of these cations does appear to favor the formation of this special class of zeolite. More generally, it is desirable to activate this type catalyst by base exchange with ammonium salts followed by calcination in air at about 540° C. for from about 15 minutes to about 24 hours.

Natural zeolites may sometimes be converted to zeolite structures of the class herein identified by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite.

Crystalline zeolites used in the present invention may have a crystal dimension of from about 0.01 to 100 microns, e.g., from about 0.02 to 10 microns.

In one aspect of this invention, the zeolites hereof are selected as those providing among other things a crystal framework density, in the dry hydrogen form, of not less than about 1.6 grams per cubic centimeter. Therefore, the first particular class of zeolites useful with respect to this invention may have a Constraint Index as defined above of about 1 to about 12, a silica to alumina mole ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on Page 19 of the article ZEOLITE STRUCTURE by W. M. Meier. This paper, the entire contents of which are incorporated herein by reference, is included in PROCEEDINGS OF THE CONFERENCE ON MOLECULAR SIEVES, (London, April 1967) published by the Society of Chemical Industry, London, 1968.

When the crystal structure is unknown, the crystal framework density may be determined by classical pyknometer techniques. For example, it may be determined by immersing the dry hydrogen form of the zeolite in an organic solvent which is not sorbed by the crystal. Or, the crystal density may be determined by mercury porosimetry, since mercury will fill the interstices between crystals but will not penetrate the intracrystalline free space.

Crystal framework densities of some typical zeolites are:

| | Void Volume | Framework Density |
|---|---|---|
| Ferrierite | 0.28 cc/cc | 1.76 g/cc |
| Mordenite | .28 | 1.7 |
| ZSM-5, -11 | .29 | 1.79 |
| ZSM-12 | — | 1.8 |
| ZSM-23 | — | 2.0 |
| Dachiardite | .32 | 1.72 |
| L | .32 | 1.61 |
| Clinoptilolite | .34 | 1.71 |
| Laumontite | .34 | 1.77 |
| ZSM-4 (Omega) | .38 | 1.65 |
| Heulandite | .39 | 1.69 |
| P | .41 | 1.57 |
| Offretite | .40 | 1.55 |
| Levynite | .40 | 1.54 |
| Erionite | .35 | 1.51 |
| Gmelinite | .44 | 1.46 |
| Chabazite | .47 | 1.45 |
| A | .5 | 1.3 |
| Y | .48 | 1.27 |

When synthesized in the alkali metal form, the zeolite is conveniently converted to the hydrogen form, generally by intermediate formation of the ammonium form as a result of ammonium ion exchange and calcination of the ammonium form to yield the hydrogen form. In addition to the hydrogen form, other forms of the zeolite wherein the original alkali metal has been reduced to less than about 1.5 percent by weight may be used as precursors to the transition metal modified zeolites of the present invention. Thus, the original alkali metal of the zeolite may be replaced by ion exchange with other suitable metal cations of Groups I through VIII of the Periodic Table, including, by way of example, nickel, copper, zinc, palladium, calcium or rare earth metals. As indicated, it is generally the hydrogen form of the zeolite component which is ion exchanged with transition metal in accordance with the present invention.

In practicing the olefin polymerization process of the present invention, it may be useful to incorporate the above-described crystalline zeolites with a matrix comprising another material resistant to the temperature and other conditions employed in the process. Such matrix material is useful as a binder and imparts greater resistance to the catalyst for the temperature, pressure and reactant feed stream velocity conditions encountered in, for example, polymerization processes.

Useful matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin families, which families include the sub-bentonites and the kaolins commonly known as Dixie, McNamee-Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolites employed herein may be composited with a porous matrix material, such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The matrix may be in the form of a cogel. The relative proportions of zeolite component and inorganic oxide gel matrix, on an anhydrous basis, may vary widely with the zeolite content ranging from between about 1 to about 99 percent by weight and more usually in the range of about 5 to about 80 percent by weight of the dry composite.

Chromium ions may be ion exchanged with zeolites in accordance with techniques within the skill of those of ordinary skill in the art.

The zeolite based chromium catalysts prepared in accordance with the present invention can be used to catalyze polymerization of 1-olefins. The polymers produced using the catalysts of this invention are normally solid polymers of at least one mono-1-olefin containing from 2 to 8 carbon atoms per molecule. The catalysts of the invention are particularly useful for the preparation of high melt flow ethylene polymers. These preferred polymers are normally solid homopolymers of ethylene or copolymers of ethylene with another mono-1-olefin containing 3 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80–99, preferably 95–99 mole percent of ethylene. These polymers are well suited for extrusion, blow molding, injection molding and the like.

The polymerization reaction can be conducted by contacting monomer or monomers, e.g., ethylene, alone or with one or more other olefins, and in the substantial absence of catalyst poisons such as moisture and air, with a catalytic amount of the supported organometallic catalyst at a temperature and at a pressure sufficient to initiate the polymerization reaction. If desired, an inert organic solvent may be used as a diluent and to facilitate materials handling if the polymerization reaction is conducted with the reactants in the liquid phase, e.g. in a particle form (slurry) or solution process. The reaction may also be conducted with reactants in the vapor phase, e.g., in a fluidized bed arrangement in the absence of a solvent but, if desired, in the presence of an inert gas such as nitrogen.

The polymerization reaction is carried out at temperatures of from about 30° C. or less, up to about 200° C. or more, depending to a great extent on the operating pressure, the pressure of the olefin monomers, and the particular catalyst being used and its concentration. Naturally, the selected operating temperature is also dependent upon the desired polymer melt index since temperature is definitely a factor in adjusting the molecular weight of the polymer. Preferably, the temperature used is from about 30° C. to about 100° C. in a conventional slurry or "particle forming" process or from 100° C. to 150° C. in a "solution forming" process. A temperature of from about 70° to 110° C. can be employed for fluidized bed processes.

The pressure to be used in the polymerization reactions can be any pressure sufficient to initiate the polymerization of the monomer(s) to high molecular weight polymer. The pressure, therefore, can range from subatmospheric pressures, using an inert gas as diluent, to superatmospheric pressures of up to about 30,000 psig or more. The preferred pressure is from atmospheric (0 psig) up to about 1000 psig. As a general rule, a pressure of 20 to 800 psig is most preferred.

The selection of an inert organic solvent medium to be employed in the solution or slurry process embodiments of this invention is not too critical, but the solvent should be inert to the supported organometallic catalyst and olefin polymer produced, and be stable at the reaction temperature used. It is not necessary, however, that the inert organic solvent medium also serve as a solvent for the polymer to be produced. Among the inert organic solvents applicable for such purposes may be mentioned saturated aliphatic hydrocarbons having from about 3 to 12 carbon atoms per molecule such as hexane, heptane, pentane, isooctane, purified kerosene and the like, saturated cycloaliphatic hydrocarbons having from about 5 to 12 carbon atoms per molecule such as cyclohexane, cyclopentane, dimethylcyclopentane and methylcyclohexane and the like and aromatic hydrocarbons having from about 6 to 12 carbon atoms per molecule such as benzene, toluene, xylene, and the like. Particularly preferred solvent media are cyclohexane, pentane, hexane and heptane.

Hydrogen can be introduced into the polymerization reaction zone in order to decrease the molecular weight of the polymers produced with the catalyst of this invention if desired (i.e., give a much higher Melt Index, MI), the catalyst of this invention being particularly sensitive to the beneficial effects of introducing hydrogen to control molecular weight. Partial pressure of hydrogen when hydrogen is used can be within the range of 5 to 100 psig, preferably 25 to 75 psig. The melt indices of the polymers produced in accordance with the instant invention can range from about 0.1 to about 70 or even higher.

More detailed description of suitable polymerization conditions including examples of particle form, solution and fluidized bed polymerization arrangements are found in Karapinka; U.S. Pat. No. 3,709,853; Issued Jan. 9, 1973 and Karol et al; U.S. Pat. No. 4,086,408; Issued Apr. 25, 1978. Both of these patents are incorporated herein by reference.

The effectiveness of the novel polymerization catalysts of the present invention is quite surprising in view of the relatively small external surface area of the zeolite material in comparison with the external surface area of amorphous silica materials which have conventionally been employed as supports for olefin polymerization catalysts. Also it might be expected that, with a zeolite catalyst support, rapid plugging of the zeolite interior pores would occur during the polymerization reaction. Finally, the hydroxyl content of the zeolite is relatively low, and it is the hydroxyl groups which are believed to provide the site of ion exchange with chromium ions. Notwithstanding such potential problems which might be expected to arise from the use of zeolite based polymerization catalysts, the zeolite-supported organometallic catalysts of the present invention are in fact surprisingly effective catalysts for the polymerization of 1-olefins.

The following examples illustrate various aspects of the invention but are not limiting of the invention herein.

EXAMPLE 1

Preparation of Cr ZSM-5 by exchange

The equipment consisted of a four-neck flask equipped with a mechanical stirrer, condensor, thermometer and $N_2$ inlet tube. 50 g HZSM-5 was added to the flask, followed by 10.0 grams $CrCl_3.6H_2O$ in 150 ml water and 5.0 grams aluminum turnings and 0.1 gram mercuric chloride ($HgCl_2$). The mixture was stirred, heated to 82° C. and held for one hour under $N_2$. The remaining Al turnings were screened out and the zeolite separated by filtration. The zeolite was washed with water until no chloride could be detected (with $AgNO_3$) in the filtrate. The Cr ZSM-5 was calcined for 3 hours at 538° C. in a nitrogen atmosphere.

EXAMPLE 2

Polymerization effectiveness

A series of exchange reactions was carried out with acidic zeolites and divalent chromium ion with formation of species having controlled amounts of transition metal ion at specific sites on the zeolite. The reaction products were calcined in dry air at 540° C. overnight. The air was replaced with nitrogen during 10 minutes and the mixture cooled to 300° C. where it was reduced in a stream of carbon monoxide during one hour. The CO was then replaced with nitrogen and mixture cooled to room temperature.

These catalysts were then screened for their ability to polymerize ethylene by passing ethylene gas into the stirred mixture of catalyst suspended in heptane at 50° C. during one hour. The level of silica and the percent chromium and effectiveness as polymerization catalysts for several zeolites are given in the following table.:

| Silica | % Cr. | g used | mg Cr | g. Polymer formed |
|---|---|---|---|---|
| HZSM 5 | 0.6 | 0.55 | 3.4 | 0.88 |
| HZSM-34 | 1.1 | 0.29 | 3.2 | 0.83 |
| HZSM-38 | 0.67 | 0.49 | 3.3 | 0.28 |

The above results are felt to show a surprisingly high polymerization activity in view of the relatively low external surface area of the catalyst, e.g., as compared to an amorphous silica.

What is claimed is:

1. A process for polymerizing 1-olefins, which process comprises contacting 1-olefin monomer with a catalytically efffective amount of a catalyst composition comprising the ion exchange product of chromium ions with a crystalline aluminosilicate zeolite having a Constraint Index of at least about 1, said catalyst composition being activated by calcination.

2. A process according to claim 1 wherein said zeolite has a silica of alumina molar ratio of at least about 12 and a Constraint Index within the approximate range of about 1 to 12.

3. A process according to claim 2 wherein said zeolite is selected from ZSM-5, ZSM-11, ZSM-12, ZSM-23, ZSM-35, ZSM-38 and ZSM-48.

4. A process according to claim 1 wherein said composition further comprises a catalyst binder.

5. A process according to claim 1 wherein said zeolite is ZSM-5.

6. A process according to claim 1 wherein said olefin monomer is ethylene.

7. A process according to claim 1 wherein said polymerization reaction conditions include a temperature from about 30° to 200° C. and a pressure from about 0 to 1000 psig.

8. A process according to claim 1 wherein the polymerization reaction is conducted with reactants in the liquid phase and in the presence of an inert organic solvent.

9. A process according to claim 1 wherein the polymerization reaction is conducted with the reactants in the vapor phase.

10. A process according to claim 9 wherein the vapor phase polymerization reaction is conducted with the catalyst in a fluidized bed.

11. A process according to claim 1 wherein said zeolite is selected from Zeolite T, Zeolite W and ZSM-34.

12. A process according to claim 1 wherein said zeolite is ZSM-34.

13. A process according to claim 1 wherein said catalyst further comprises a binder for said zeolite.

* * * * *